United States Patent
Raz et al.

(10) Patent No.: US 9,274,221 B2
(45) Date of Patent: Mar. 1, 2016

(54) METHOD AND APPARATUS FOR REMOTE OBJECT SENSING EMPLOYING COMPRESSIVE SENSING

(71) Applicant: GM GLOBAL TECHNOLOGY OPERATIONS LLC, Detroit, MI (US)

(72) Inventors: Guy Raz, Rehovot (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 13/756,606

(22) Filed: Feb. 1, 2013

(65) Prior Publication Data

US 2014/0218226 A1    Aug. 7, 2014

(51) Int. Cl.
| G01S 13/93 | (2006.01) |
| G01S 7/35 | (2006.01) |
| G01S 13/34 | (2006.01) |
| G01S 13/86 | (2006.01) |

(52) U.S. Cl.
CPC .............. G01S 13/931 (2013.01); G01S 7/354 (2013.01); G01S 13/343 (2013.01); G01S 13/345 (2013.01); G01S 13/867 (2013.01); G01S 2007/356 (2013.01); G01S 2013/9375 (2013.01); G01S 2013/9389 (2013.01)

(58) Field of Classification Search
CPC ... G01S 13/9035; G01S 7/411; G01S 13/867; G01S 2013/9375; G01S 2013/9389
USPC ............................................ 342/70, 118, 195
See application file for complete search history.

(56) References Cited

U.S. PATENT DOCUMENTS

| 5,923,285 | A | 7/1999 | Andrusiak et al. |
| 6,400,308 | B1* | 6/2002 | Bell et al. ........................ 342/71 |
| 6,674,394 | B1* | 1/2004 | Zoratti .......................... 342/70 |
| 7,343,232 | B2 | 3/2008 | Duggan et al. |
| 7,460,951 | B2 | 12/2008 | Altan et al. |
| 7,928,893 | B2 | 4/2011 | Baraniuk et al. |
| 2010/0001901 | A1* | 1/2010 | Baraniuk et al. ............. 342/25 F |
| 2010/0191391 | A1* | 7/2010 | Zeng ................................. 701/1 |
| 2011/0241934 | A1* | 10/2011 | Sarkis .......................... 342/191 |
| 2011/0279324 | A1* | 11/2011 | Bolotski et al. ............... 342/451 |
| 2012/0313810 | A1* | 12/2012 | Nogueira-Nine ............. 342/128 |
| 2014/0035776 | A1* | 2/2014 | Sochen et al. ................ 342/107 |
| 2014/0077989 | A1* | 3/2014 | Healy et al. .................. 342/25 F |

OTHER PUBLICATIONS

Candes, E.J. ; Compressive Sampling; IEEE Signal Processing Magazine, Mar. 2008.*
Baraniuk, R.; Compressive Sensing, Lecture Notes in IEEE Signal Processing Magazine; vol. 24, Jul. 2007.
Donoho, D.L.;Compressed Sensing; Sep. 14, 2004.

(Continued)

*Primary Examiner* — John B Sotomayor
*Assistant Examiner* — Marcus Windrich

(57) ABSTRACT

A method for remote object sensing on-board a vehicle includes employing compressive sensing to analyze a waveform originating from an on-vehicle low-resolution radar imaging system and reflected from a remote object. The compressive sensing includes generating a matrix including a temporal projection, a Fourier transform, and an integral term configured to analyze the reflected waveform. Leading and trailing edges of the remote object are identified by employing a norm minimization procedure to reconstruct a range profile based upon the reflected waveform analyzed by the compressive sensing.

14 Claims, 3 Drawing Sheets

(56) References Cited

OTHER PUBLICATIONS

Candes, E.J.; Compressive Sampling; Proc. of Int'l Congress of Mathematicians, Madrid, Spain, 2006.

Candes, E.J.; Compressive Sampling; IEEE Signal Processing Magazine; Mar. 2008.

Romberg, J.; Compressed Sensing: A Tutorial; IEEE Statistical Signal Processing Workshop; Madison, WI, Aug. 26, 2007.

* cited by examiner

US 9,274,221 B2

METHOD AND APPARATUS FOR REMOTE OBJECT SENSING EMPLOYING COMPRESSIVE SENSING

TECHNICAL FIELD

This disclosure is related to on-vehicle object-sensing systems, and more specifically to radar systems employed in object-sensing systems.

BACKGROUND

The statements in this section merely provide background information related to the present disclosure. Accordingly, such statements are not intended to constitute an admission of prior art.

Vehicles may be equipped with various remote sensing devices and systems that assist a vehicle operator in managing vehicle operation and navigation. Known systems for ground vehicles can include autonomic control systems to control vehicle operation. For example, vehicles employ cruise control systems to maintain a travel speed of the vehicle at an operator-selected speed. Further, vehicles employ adaptive cruise control systems to control speed based on both the operator-selected speed and the presence of and distance to another vehicle in a projected travel path. Exemplary vehicle detection systems used by adaptive cruise control systems include radar detection devices and LIDAR detection devices to detect the position and speed of other vehicles within the projected travel path of the subject vehicle.

Known remote sensing systems employed on-vehicle have different operating ranges and angular coverages, and are capable of estimating different parameters within their operating range. For example, known radar sensors are capable of estimating range, range rate and azimuth location of a remote object. Known cameras with vision processors are effective in estimating a shape and azimuth position of a remote object, but are less effective at estimating the range and range rate of the remote object. Known scanning type LIDARs are effective at estimating range, and azimuth position, but are less effective at estimating range rate, and are therefore not effective with respect to new object acquisition/recognition. Ultrasonic sensors are effective at estimating range but are less effective at estimating or computing range rate and azimuth position of a remote object. Further, it is appreciated that the performance of each sensor technology may be affected by changes in environmental conditions.

Known radar systems operate at different frequency bands ranging between A-band at HF (less than 100 MHz) and VHF (about 150 MHz) up to and beyond W-band (100 GHz), including ultra-wideband radar (UWB) systems. Regulations including those promulgated by the US Federal Communications Commission (FCC) may limit on-vehicle applications of UWB radar systems. Known frequency bands for automotive radar include an ISM band of 250 MHz around 24 GHz and a dedicated automotive radar band between 77-78 GHz.

SUMMARY

A method for remote object sensing on-board a vehicle includes employing compressive sensing to analyze a waveform originating from an on-vehicle low-resolution radar imaging system and reflected from a remote object. The compressive sensing includes generating a matrix including a temporal projection, a Fourier transform, and an integral term configured to analyze the reflected waveform. Leading and trailing edges of the remote object are identified by employing a norm minimization procedure to reconstruct a range profile based upon the reflected waveform analyzed by the compressive sensing.

BRIEF DESCRIPTION OF THE DRAWINGS

One or more embodiments will now be described, by way of example, with reference to the accompanying drawings, in which:

FIGS. 4-1, 4-2 and 4-3 illustrates simulated results associated with operation of a sensing scheme that is executing compressive sensing including a measurement matrix 1 for the reflected LFM waveform as part of the compressive sensing analytical scheme, in accordance with the disclosure; and FIGS. 5-1, 5-2 and 5-3 illustrates simulated results associated with operation of a sensing scheme that is executing CS/integration data transformation as part of the compressed sensing analytical scheme, in accordance with the disclosure.

DETAILED DESCRIPTION

Figure 1:
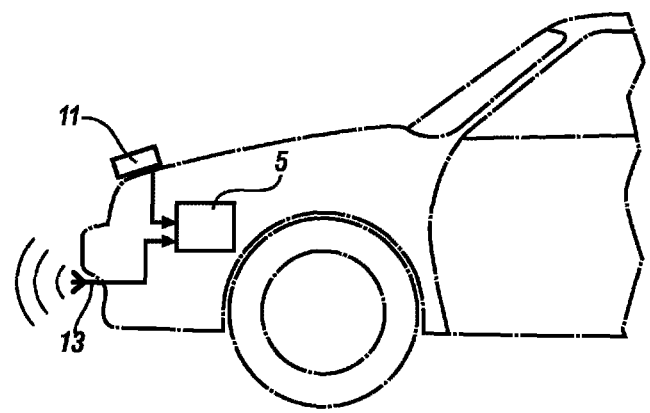
FIG. 1 illustrates an exemplary arrangement of a vehicle equipped with a radar imaging system, in accordance with the present disclosure.

Referring now to the drawings, wherein the showings are for the purpose of illustrating certain exemplary embodiments only and not for the purpose of limiting the same, FIG. 1 schematically illustrates a front portion of a vehicle equipped with an exemplary arrangement of remote object sensing systems including a radar imaging system 13 and camera 11. The radar imaging system 13 and camera 11 communicate with a control module 5. In one embodiment, the control module 5 contains software and firmware that are configured to process signal inputs from the radar imaging system 13 to detect a clear path of travel. Detecting a clear path of travel includes evaluating a travel path to determine whether it is free of objects. The vehicle may use other methods to detect a clear path of travel in addition to the use of the radar imaging system 13, including, e.g., the camera 11, GPS information, information from other vehicles in communication with the vehicle, historical data concerning the particular roadway, and biometric information such as systems detecting visual focus of the vehicle operator.

The radar imaging device 13 preferably is a low-resolution system (e.g., a 150 MHz radar system in one embodiment) that includes a transmitter capable of emitting an EM waveform, a receiver device capable of receiving reflected EM waves from one or more remote objects, and data acquisition and signal processing elements to process the received reflected EM waves. In one embodiment, the EM waveform is a linear frequency modulation (LFM) waveform that may be employed in an automotive radar system. Analyzed measurements from the radar imaging device 13 include range and azimuth of the remote objects reflecting the EM waves. The camera 11 is a device that is capable of translating visual inputs in the form of light, infrared, or other electro-magnetic (EM) radiation into a data format readily capable of analysis, e.g., a digital, pixelated image. In one embodiment, the camera may not be included.

The control module 5 is illustrated in FIG. 1 and described herein as a discrete element for purposes of discussion. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, routines and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at suitable regular intervals, for example each 0.1, 1.0, 3.125, 6.25, 12.5, 25 and 100 milliseconds during ongoing engine and vehicle operation.

The exemplary vehicle is a passenger vehicle intended for use on highways, although it is understood that the disclosure described herein is applicable on any vehicle or other system seeking to monitor position and trajectory of remote vehicles and other objects. The control module 5 is part of a vehicle control system preferably including a plurality of controllers each containing executable routines and calibrations that provide coordinated vehicle system control. The control system monitors inputs from sensors, synthesizes pertinent information and inputs, and executes routines to control actuators to achieve control objectives, for example including collision avoidance and adaptive cruise control. The vehicle control system includes a system controller providing functionality such as antilock braking, traction control, and vehicle stability.

The radar imaging device 13 may be configured as either or both a short-range radar subsystem and a long-range radar subsystem. Other object-locating sensors may include a forward vision system and range sensors, such as described herein above including FM-CW radars, (Frequency Modulated Continuous Wave), and FSK (Frequency Shift Keying) radars. Such sensing systems may be employed in automotive applications for detecting and locating objects, and may be applied in systems configured to execute control schemes associated with adaptive cruise control, collision avoidance, pre-crash preparation, and side-object detection.

The radar imaging device 13 is preferably positioned within the vehicle in an unobstructed position relative to a view in front of the vehicle, behind the vehicle, and alongside of the vehicle without limitation. Multiple radar imaging devices 13 may be employed, with each device providing an estimate of actual location or condition of an object, wherein said estimate includes an estimated position and standard deviation. As such, sensory detection and measurement of object locations and conditions are often referred to as "estimates."

Each radar imaging device 13 provides an output including range ($R$), time-based change in range ($\dot{R}$), and angle ($\Theta$), preferably with respect to a longitudinal axis of the vehicle, which can be written as a measurement vector o representing sensor data. An exemplary short-range radar subsystem has a field-of-view (FOV) of 160 degrees and a maximum range of seventy meters. An exemplary long-range radar subsystem has a field-of-view of 17 degrees and a maximum range of 220 meters. For each subsystem the field-of-view is preferably oriented around the longitudinal axis of the vehicle.

Figure 2:
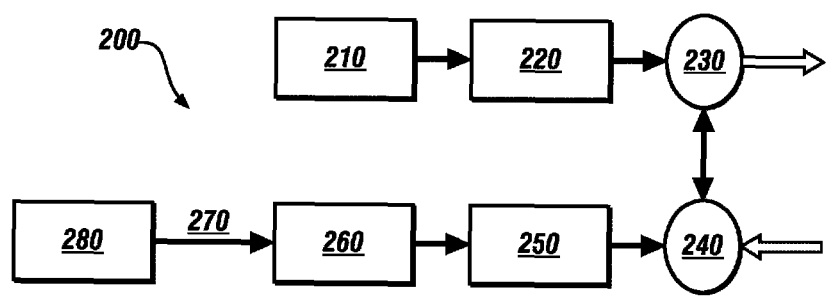
FIG. 2 illustrates a radar system that includes a signal processor executing a compressed sensing analytical scheme that includes compressive sensing (CS) and integration data transformation to extract information from a reflected linear frequency modulation (LFM) waveform transmitted by a low-resolution radar system, in accordance with the present disclosure.

FIG. 2 schematically shows a radar system 200 that includes a signal processor 280 employing routines and calibrations to execute a compressed sensing analytical scheme that includes compressive sensing (CS) and integration data transformation to extract information including leading and trailing edges of one or more remote objects from a reflected linear frequency modulation (LFM) waveform transmitted by a low-resolution radar system, e.g., the radar imaging device 13 described with reference to FIG. 1. The radar system 200 includes a waveform generator 210 coupled to a radio-frequency (RF) transmitter 220 coupled to a sending antenna 230. Transmitting a radar signal includes generating a waveform in the waveform generator 210 that is transmitted by the RF transmitter 220 and sending antenna 230. In one non-limiting embodiment, the preferred waveform is a LFM waveform having a narrow bandwidth. Preferably, the narrow bandwidth LFM waveform provides a low range resolution that is inversely proportional to the bandwidth. A receiving antenna 240 is coupled to a receiver 250 that is configured to receive reflected waveforms, i.e., reflected LFM waveforms that pass through an analog-to-digital (A/D) converter 260. The A/D converter 260 generates a digitized form of the reflected LFM waveform 270 that is input to a signal processor 280.

The receiver 250, A/D converter 260 and signal processor 280 are configured to employ a compressive sensing analytical scheme that is employed to analyze the reflected LFM waveform to identify object(s), including detecting leading and trailing edges of each of the identified objects. When the radar system 200 is applied to a land vehicle, e.g., employed on an automotive application, the identified objects can include other moving vehicles, pedestrians, and stationary elements such as guardrails and bridge abutments that are within a field of view of the radar system 200. The compressive sensing (CS) framework reduces required bandwidths for the receiver 250 and the A/D converter 260 as compared to wide bandwidth systems. Furthermore, the A/D converter 260 operates at a reduced sampling rate as compared to one employed in a wide bandwidth system. In one embodiment, the A/D converter 260 is a low-rate A/D converter that operates at a rate that is proportional to compressibility of sensed objects. The compressive sensing (CS) framework also reduces or eliminates a need for a matched filter in the receiver signal path. The received radar signal corresponds to a convolution of the transmitted waveform and a radar scene reflectivity function, i.e., the reflected LFM waveform having the narrow bandwidth and the radar scene reflectivity function. Furthermore, the CS framework allows sparse data to be robustly and efficiently recovered from an under-sampled data set. In one embodiment the CS framework is implemented in context of the reflected LFM waveform by embedding a temporal base band sequence in a zero-padded much longer sequence. The CS framework reconstructs sparse objects on a dense grid with relatively high accuracy. The CS framework can be adapted to operate on a range derivative to reconstruct an extended object with great accuracy to correctly position leading and trailing ends of the extended object.

The compressive sensing (CS) framework operates to simultaneously sense and compress the reflected radar signal.

The CS framework builds upon an understanding that a data stream representing a sensed signal x, e.g., a received reflected waveform that includes reflected LFM waveforms, contains an analytical structure that can be mathematically represented and thus processed to extract useable information. The data stream representing the sensed signal x can include a relatively large quantity of signal samples. However, the sensed signal x can have a sparse representation in terms of a basis ψ, which means that a small quantity of K non-adaptively chosen transform coefficients corresponding to the data stream representing the sensed signal x can be used to represent the complete signal, wherein K<N, and N represents a quantity of samples. The data can be described as a K-sparse representation of the sensed signal, which is a compressed representation of the data stream representing the sensed signal x.

The CS framework is employed to transform the data to determine a measurement matrix Φ that is applied to the reflected LFM waveform using a temporal projection matrix [0 I 0]. The temporal projection matrix [0 I 0] is preferably predetermined in an off-line environment, and takes the following form:

$$\begin{bmatrix} 0 & \dots & 0 & 1 & \dots & 0 & 0 & \dots & 0 \\ \vdots & \ddots & \vdots & & \ddots & \vdots & \vdots & \ddots & \vdots \\ 0 & \dots & 0 & 0 & \dots & 1 & 0 & \dots & 0 \end{bmatrix} \quad [1]$$

The temporal projection matrix [0 I 0] is multiplied by a Fourier transform matrix [F] coupled with an integral term [It] to determine edges of an object, in accordance with the following relationship:

$$\Phi = \varphi S = \begin{bmatrix} 0 & \dots & 0 & 1 & \dots & 0 & 0 & \dots & 0 \\ \vdots & \ddots & \vdots & & \ddots & \vdots & \vdots & \ddots & \vdots \\ 0 & \dots & 0 & 0 & \dots & 1 & 0 & \dots & 0 \end{bmatrix} \begin{bmatrix} e^{j2\pi f_1 t_1} & \dots & e^{j2\pi f_1 t_n} \\ \vdots & \ddots & \vdots \\ e^{j2\pi f_n t_1} & \dots & e^{j2\pi f_n t_n} \end{bmatrix} \quad [2]$$

$$\begin{bmatrix} \frac{1}{j\frac{t_1}{\tau}} & \dots & 0 \\ \vdots & \ddots & \vdots \\ 0 & \dots & \frac{1}{j\frac{t_n}{\tau}} \end{bmatrix}$$

wherein $t_1 \dots t_n$ are sampling times, and $f_1 \dots f_n$ are frequencies within the bandwidth of the transmitted LFM waveform.

EQ. 2 can be simplified to the following relationship:

$$\Phi = \psi^* s = [0\ I\ 0]^*[F]^*[It] \quad [3]$$

wherein ψ is the sparse representation of the sensed data;

[0 I 0] represents the temporal projection matrix shown with reference to EQ. 1 and employed in EQ. 2;

[F] represents the Fourier transform matrix; and

[It] represents the integral term.

A sparse point object can be recovered with xN accuracy and resolution using linear programming that executes in accordance with the following relationship:

$$\min_{\hat{x} \in R^N} \|\hat{x}\|_{l_1} \quad [4]$$

wherein $\widehat{X}$ represents the sampled data, as described herein, and $l_1$ represents an L1 norm minimization.

The integral term [It] facilitates operating the system in derivative space, thus improving accuracy in finding leading and trailing edges in the reflected LFM waveform using the low-resolution radar, e.g., 150 MHz. The sensing matrix can achieve high range resolution of the reflected LFM waveform and can be used to estimate location of an extended object detected by the reflected LFM waveform.

Figure 3:
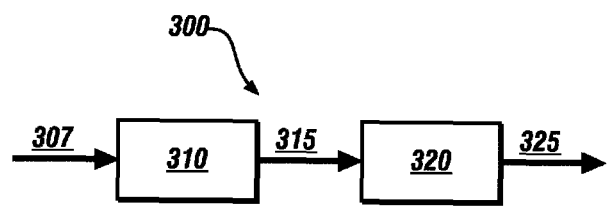
FIG. 3 illustrates an embodiment of a compressive sensing analytical scheme that includes signal recovery and reconstruction processes that can be employed to find leading and trailing edges of a remote object in a reflected LFM waveform using low-resolution radar, in accordance with the disclosure.

FIG. 3 schematically shows an embodiment of a compressive sensing analytical scheme 300 that includes signal recovery and reconstruction processes that can be employed to find leading and trailing edges of a remote object in a reflected LFM waveform using low-resolution radar. The signal recovery and reconstruction process 300 is preferably executed in the signal processor 280 described with reference to FIG. 2.

The reflected LFM waveform is designated as x 307. The reflected LFM waveform x 307 is subjected to a projection analysis 310, which includes employing the temporal projection matrix [0 I 0] shown in EQ. 4 that is multiplied by Fourier transform matrix (F) described herein. The result y 315 is expressed in accordance with the following relationship:

$$y = \Phi^* x + n \quad [5]$$

wherein x is the reflected LFM waveform;

n is model noise; and

Φ is the temporal projection matrix [0 I 0] multiplied by Fourier transform matrix (F) derived using EQ. 2, above.

The result y 315 is subjected to an L1 norm minimization procedure 320 to reconstruct the sampled data $\widehat{X}$ 325. An L1 norm minimization is configured as a convex optimization problem that can be solved using linear programming or another suitable problem solving scheme that achieves a preferred or optimized result in response to a plurality of relationships each having constraints. Thus, the L1 norm minimization problem is computationally tractable. Processes to solve L1 norm minimization schemes are known to those having ordinary skill in the art, and are not described in detail herein.

The L1 norm minimization procedure 320 employs EQ. 5, and includes finding a minimum of the reflected measurement that is extracted from the sampled $\widehat{X}$ in accordance with the following relationship:

$$\min_{\hat{x} \in R^N} \|\hat{x}\|_{l_1} \quad [6]$$

which is a restatement of EQ. 4, above, and is subject to the following relationship:

$$\|\xi\|_{l_2} \leq \epsilon \quad [7]$$

wherein ε is a small number less than one and approaching zero, $$\xi = y - \Phi \widehat{X}, \text{ and}$$

further wherein the sampled $\widehat{X}$ data is the reflected LFM waveform that is extracted from the sampled data, and represents the remote object.

FIGS. 4-1, 4-2 and 4-3 graphically show simulated results associated with operation of a control scheme that is executing compressive sensing including the measurement matrix 1 for the reflected LFM waveform as part of the compressed sensing analytical scheme. Each of FIGS. 4-1, 4-2 and 4-3 shows reflected signal strength (db) on the vertical axis 410 in relation to range (m) on the horizontal axis 420 in relation to a remote object 430 having a known, fixed dimension including a first edge 432 and a second edge 434.

Figures 1, 4:
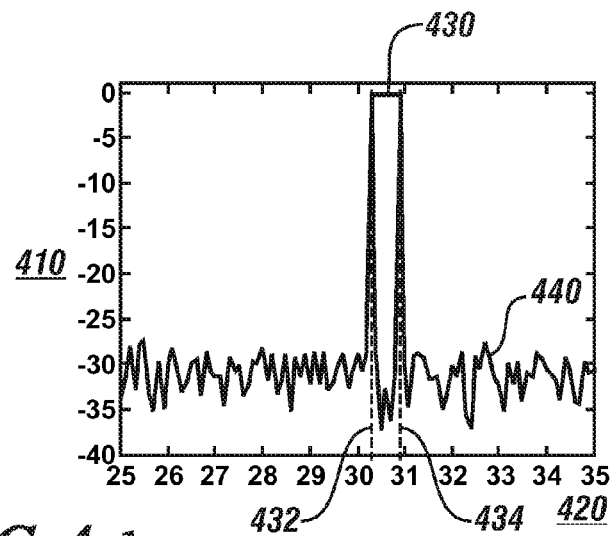
Figures 2, 4:
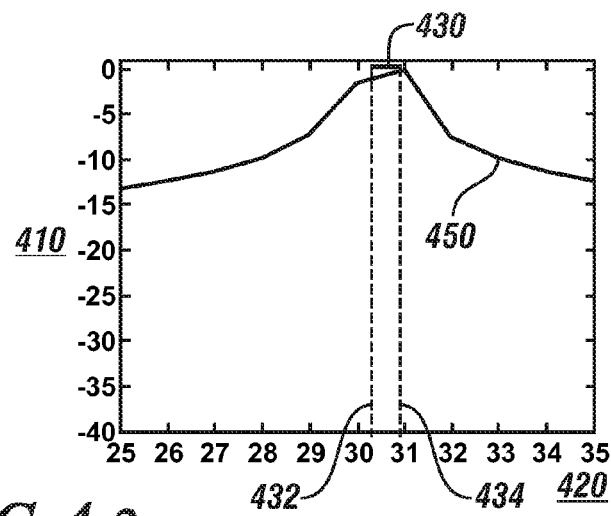
Figures 3, 4:
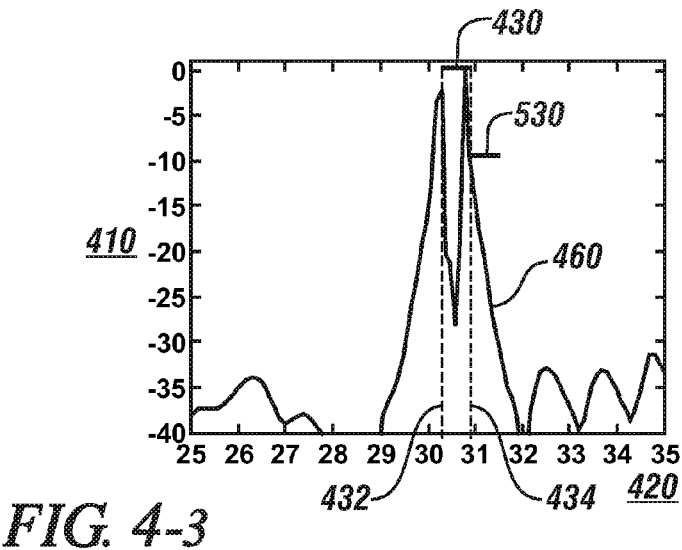

FIG. 4-1 shows reflected data 440 for a radar system employing high-resolution radar (1.5 GHz radar in this example). As shown, the first, leading edge 432 and second, trailing edge 434 of the remote object 430 are indicated by peaks in the reflected data 440 with the high-resolution radar system.

FIG. 4-2 shows reflected data 450 for a radar system employing low-resolution radar (150 MHz radar in this example). As shown, the second edge 434 of the remote object 430 is indicated by a peak in the reflected data 450, but the ability to discriminate the peaks in the reflected data 450 associated with the first edge 432 and the second edge 434 based upon the signal strength lacks resolution with the low-resolution radar system.

FIG. 4-3 shows reflected data 460 for a radar system employing low-resolution radar system (150 MHz radar in this example) in conjunction with the measurement matrix $\Phi$ for the reflected LFM waveform. As shown, the first edge 432 and second edge 434 of the remote object 430 are indicated by peaks in the reflected data 460 with an accuracy and resolution to detect the leading and trailing edges of the remote object 430 that approximates the results from the high-resolution radar system shown with reference to FIG. 4-1.

FIGS. 5-1, 5-2 and 5-3 graphically show simulated results associated with operation of a control scheme that is executing the CS/integration data transformation as part of the compressed sensing analytical scheme. Each of FIGS. 5-1, 5-2, and 5-3 shows reflected signal strength (db) on the vertical axis 510 in relation to range (m) on the horizontal axis 520 in relation to a remote object 530 having a known, fixed dimension including a first edge 532 and a second edge 534.

Figures 1, 5:
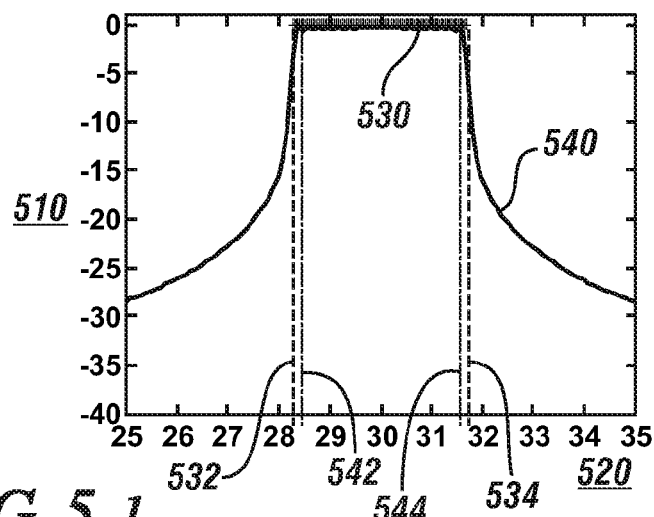
Figures 2, 5:
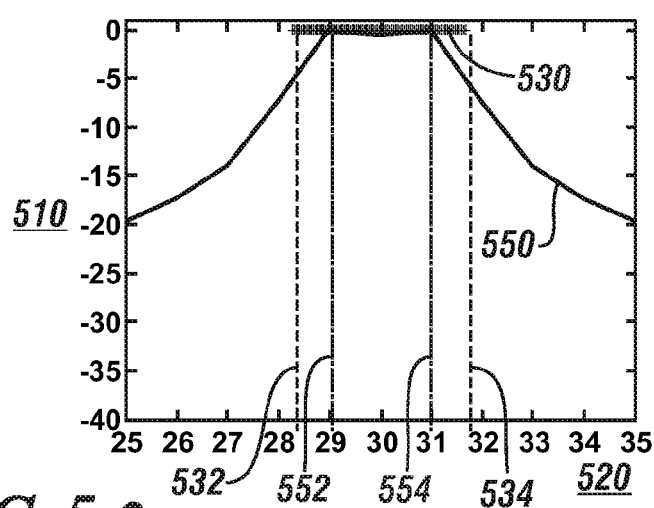
Figures 3, 5:
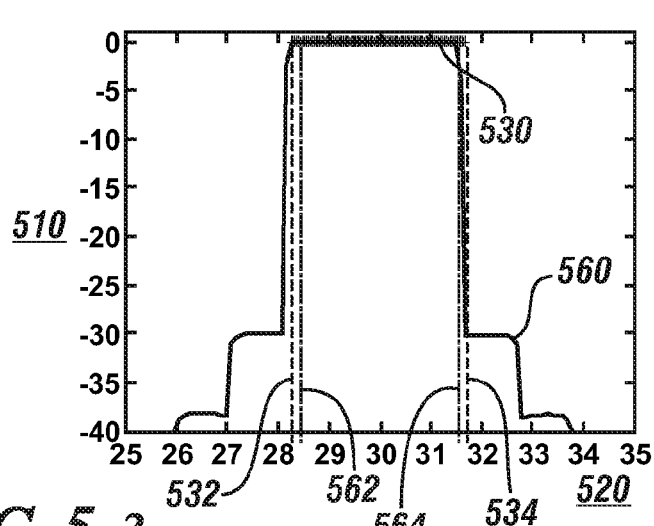

FIG. 5-1 shows reflected data 540 for a radar system employing high-resolution radar system (1.5 GHz radar in this example), including a first detected edge 542 and a second detected edge 544 associated with the remote object 530. As shown, the first detected edge 542 and second detected edge 544 reflect the corresponding first edge 532 and second edge 534 associated with the remote object 530 within 10-20 cm.

FIG. 5-2 shows reflected data 550 for a radar system employing low-resolution radar system (150 MHz radar in this example), including a first detected edge 552 and a second detected edge 554 associated with the remote object 530. As shown, the first detected edge 542 and second detected edge 544 miss the corresponding first edge 532 and second edge 534 by 80-90 cm.

FIG. 5-3 shows reflected data 560 for a radar system employing low-resolution radar system (150 MHz radar) employing the CS/integration described herein, including a first detected edge 562 and a second detected edge 564 associated with the remote object 530. As shown, the first detected edge 562 and second detected edge 564 reflect the corresponding first edge 532 and second edge 534 within 10-20 cm, i.e., is as accurate in detecting the remote object 530 as the high-resolution system shown in FIG. 5-1.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for remote object sensing on-board a vehicle, comprising:
   operating an analog-to-digital (A/D) converter at a sampling rate proportional to a compressibility of sensed objects to generate a digitized form of an on-vehicle low-resolution radar imaging system and reflected from a remote object;
   within a signal processor:
      employing compressive sensing to analyze the digitized form of the waveform originating from an on-vehicle low-resolution radar imaging system and reflected from the remote object, said compressive sensing including generating a matrix comprising a temporal projection which is predetermined in an off-line environment, a Fourier transform, and an integral term configured to analyze the reflected waveform; and
      identifying leading and trailing edges of the remote object by employing a norm minimization procedure to reconstruct a range profile based upon the reflected waveform analyzed by said compressive sensing;
      wherein employing a norm minimization procedure includes finding a minimum of the reflected waveform employing linear programming; and
   providing an estimate of an actual location of the remote object based on the identified leading and trailing edges of the remote object.

2. The method of claim 1, wherein said waveform originating from the on-vehicle low-resolution radar imaging system comprises a reflected linear frequency modulation (LFM) waveform.

3. The method of claim 2, wherein said radar imaging system comprises a low bandwidth radar device, and said LFM waveform comprises a high frequency waveform that is less than 200 MHz.

4. The method of claim 1, wherein the norm minimization procedure comprises an L1 norm minimization procedure.

5. The method of claim 1, wherein said radar imaging system comprises a low bandwidth radar device configured to monitor a field of view relative to the vehicle.

6. The method of claim 5, wherein said field of view comprises a front view relative to the vehicle.

7. The method of claim 5, wherein said field of view comprises a side view relative to the vehicle.

8. The method of claim 1, wherein compressive sensing including generating a matrix comprising the temporal projection, the Fourier transform, and the integral term configured to analyze the reflected waveform comprises employing compressive sensing to determine a measurement matrix $\Phi$ applied to the reflected waveform, wherein the measurement matrix $\Phi$ is represented by the following relationship:

$$\Phi = [0\ I\ 0] * [F] * [It]$$

wherein [0 I 0] is a temporal projection matrix,
   [F] is a Fourier transform matrix, and
   [It] is an integral term.

9. The method of claim 8, wherein said measurement matrix $\Phi$ applied to the reflected waveform is determined in a derivative space.

10. The method of claim 1, wherein identifying leading and trailing edges of the remote object comprises employing an L1 norm minimization procedure including finding a minimum of the reflected waveform ($\widehat{X}$) employing linear programming executing in accordance with the following relationship:

$$\min_{\hat{x} \in R^N} \|\hat{x}\|_{l_1}$$

subject to $$\|\xi\|_{l_2} \le \epsilon$$

wherein $\epsilon$ is a small number less than one and approaching zero, and $$\xi = y - \Phi\widehat{X}.$$

11. A method for remote object sensing on-board a vehicle employing a low-resolution radar imaging system, comprising:
  operating an analog-to-digital (A/D) converter at a sampling rate proportional to a compressibility of sensed objects to generate a digitized form of a linear frequency modulation (LFM) waveform generated by the low-resolution radar imaging system and reflected from a remote object;
  within a signal processor:
    employing compressive sensing to analyze the digitized form of the LFM waveform generated by the low-resolution radar imaging system and reflected from the remote object, said compressive sensing including determining a measurement matrix for the remote object in a derivative space based upon a temporal projection which is predetermined in an off-line environment, a Fourier transform, and an integral term; and
    identifying leading and trailing edges of the remote object by employing a norm minimization procedure to reconstruct a range profile based upon the measurement matrix for the remote object in the derivative space;
  wherein employing a norm minimization procedure includes finding a minimum of the reflected waveform employing linear programming; and
  providing an estimate of an actual location of the remote object based on the identified leading and trailing edges of the remote object.

12. The method of claim 11, wherein the norm minimization procedure comprises an L1 norm minimization procedure.

13. The method of claim 11, wherein determining the measurement matrix for the remote object comprises determining a measurement matrix $\Phi$ applied to the reflected LFM waveform wherein the measurement matrix $\Phi$ is represented by the following relationship:

$$\Phi = [0\ I\ 0]^*[F]^*[It]$$

wherein [0 I 0] is a temporal projection matrix,
  [F] is a Fourier transform matrix, and
  [It] is an integral term.

14. The method of claim 11, wherein identifying leading and trailing edges of the remote object comprises employing an L1 norm minimization procedure including finding a minimum of the reflected waveform ($\widehat{X}$) employing linear programming executing in accordance with the following relationship:

$$\min_{\hat{x} \in R^N} \|\hat{x}\|_{l_1}$$

subject to $$\|\xi\|_{l_2} \le \epsilon$$

wherein $\epsilon$ is a small number less than one and approaching zero, and $$\xi = y - \Phi\widehat{X}.$$

* * * * *